July 14, 1970 K. W. NICHOLSON 3,520,369
RESILIENT DRAFT SENSING DEVICE
Original Filed Oct. 23, 1965 4 Sheets-Sheet 1
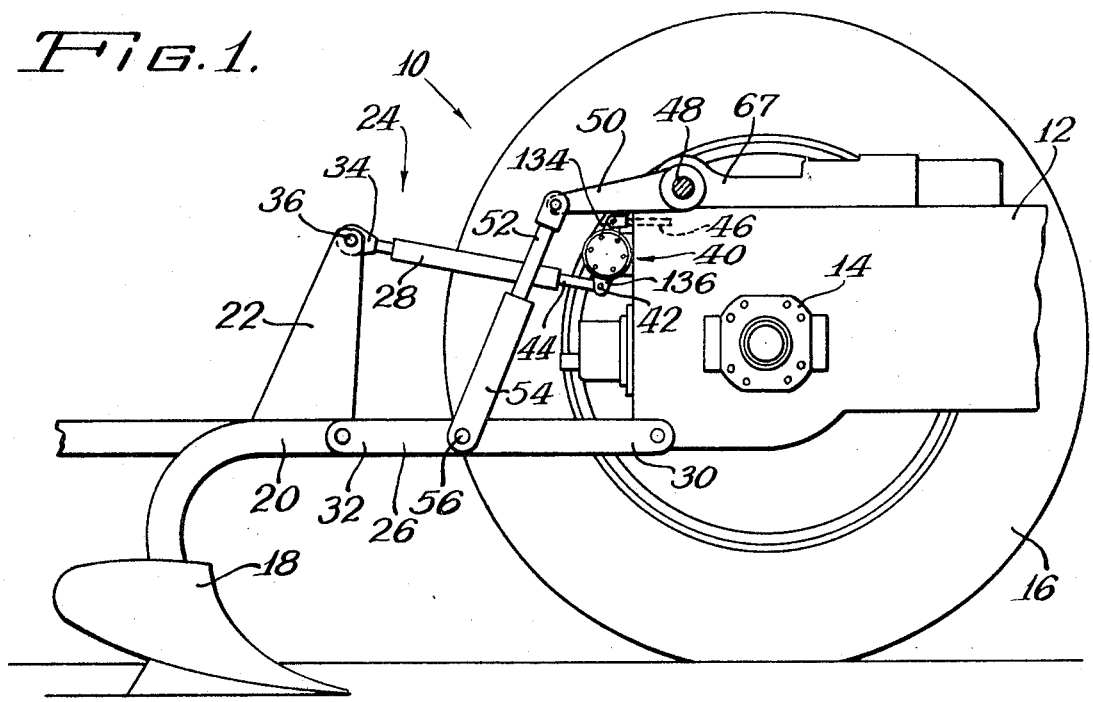
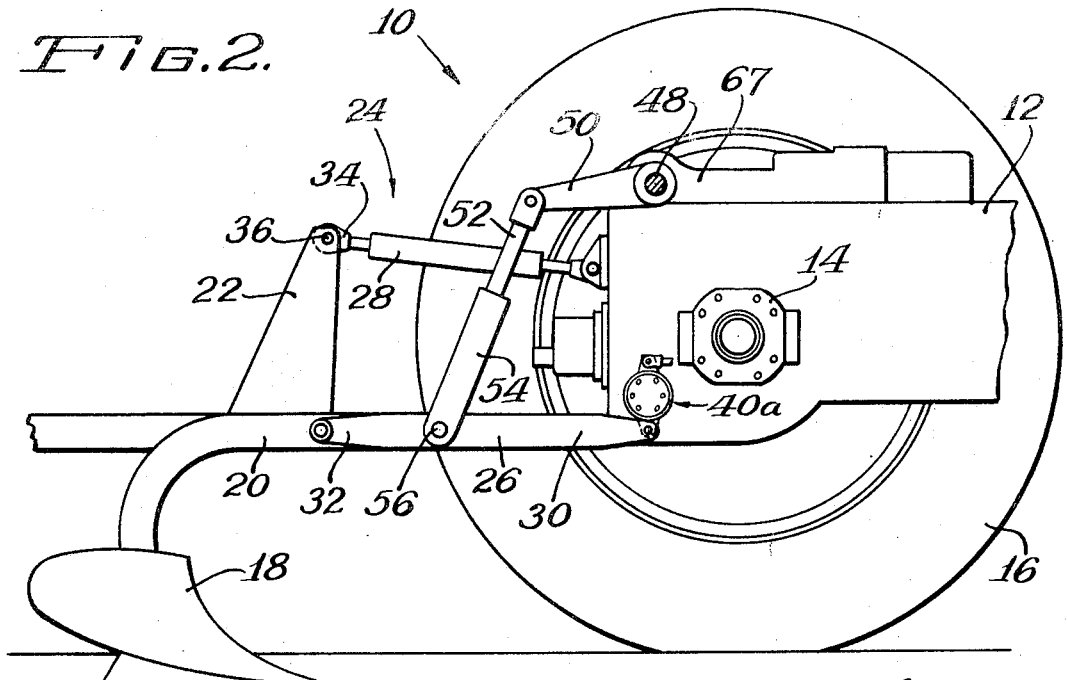
Inventor:
Kenneth W. Nicholson
By Walter G. Treason
Atty.

Inventor:
Kenneth W. Nicholson
By Walter L. Gregory
Atty.

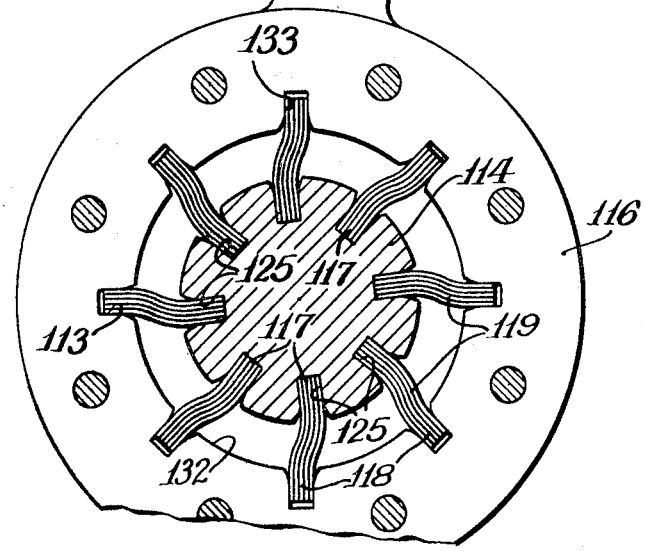
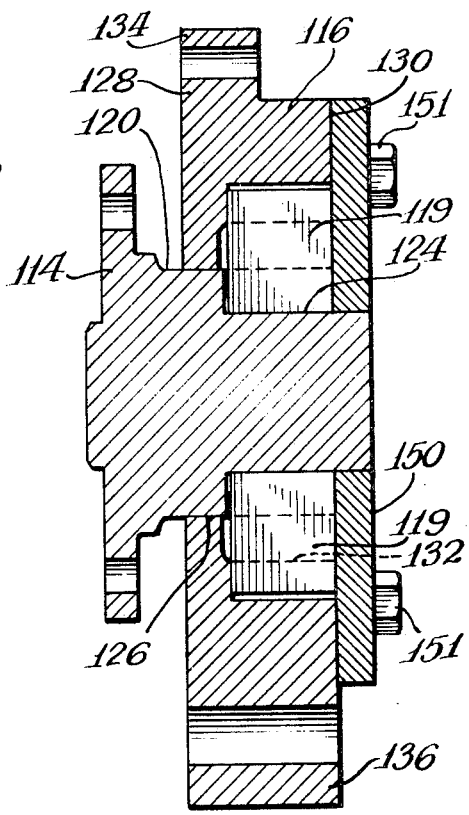
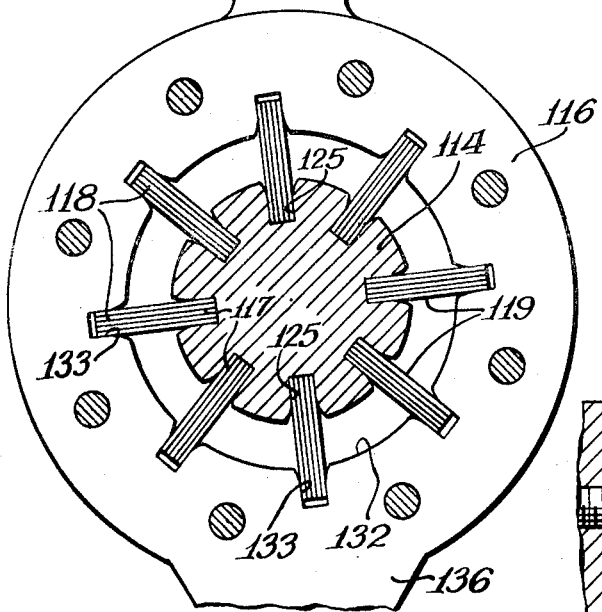
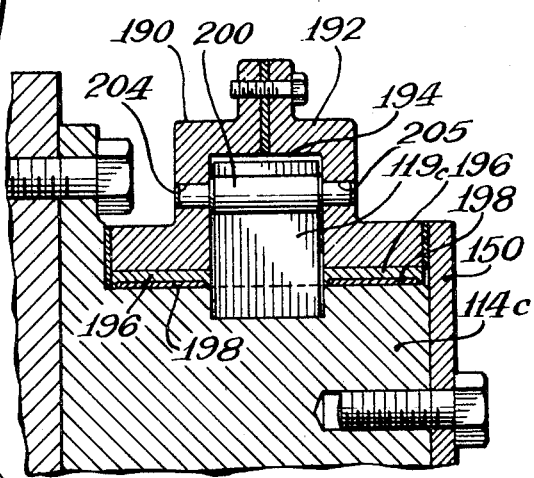
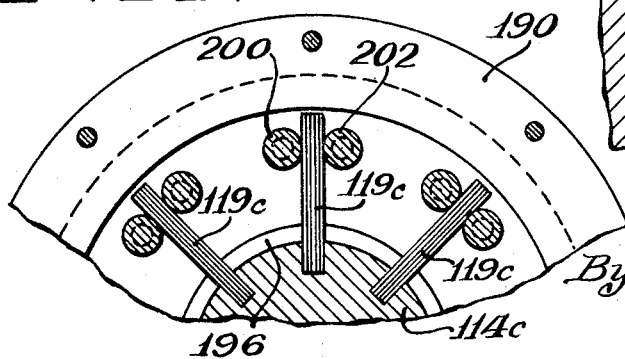

July 14, 1970     K. W. NICHOLSON     3,520,369
RESILIENT DRAFT SENSING DEVICE
Original Filed Oct. 23, 1965     4 Sheets-Sheet 4
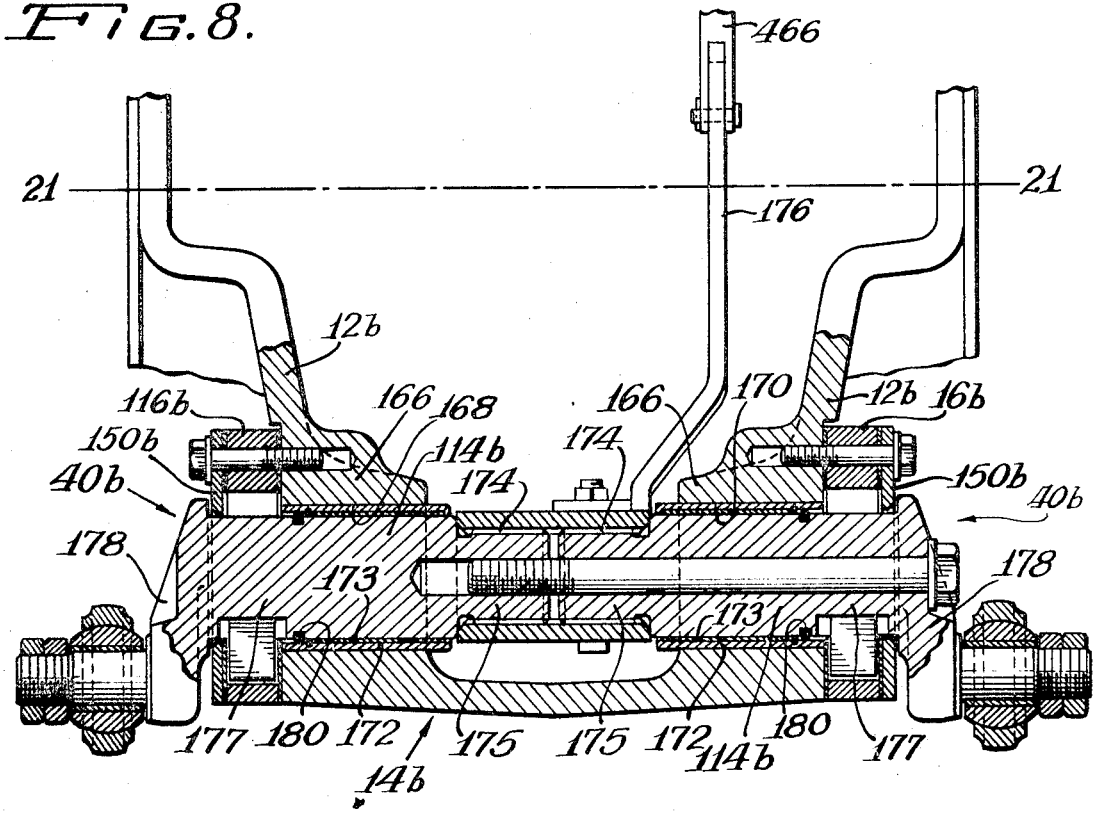
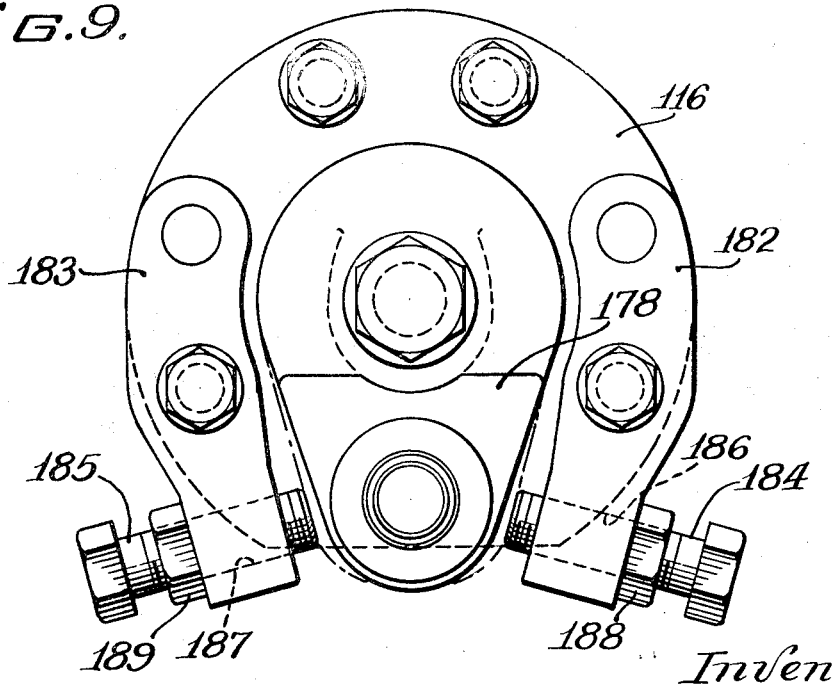
Inventor:
Kenneth W. Nicholson
By Haller T. Gray
Atty.

United States Patent Office 3,520,369
Patented July 14, 1970

3,520,369
RESILIENT DRAFT SENSING DEVICE
Kenneth W. Nicholson, Chicago Ridge, Ill., assignor to International Harvester Company, Chicago, Ill., a corporation of New Jersey
Continuation of application Ser. No. 504,027, Oct. 23, 1965. This application Feb. 27, 1969, Ser. No. 804,374
Int. Cl. A01b 63/112
U.S. Cl. 172—7                                    18 Claims

ABSTRACT OF THE DISCLOSURE

An improved draft sensing means for a tractor draft control system having relatively rotatable inner and outer members, one of the members being attached to the tractor, the other adapted for connection to the implement, with resilient means interposed between said members for resiliently opposing the draft force of an implement when stressed in elastic bending.

---

This is a continuation of application Ser. No. 504,027, filed Oct. 23, 1965, now abandoned.

This invention relates generally to draft control systems employed with implement-attaching hitch mechanisms for agricultural tractors. More particularly, the invention relates to an improved draft control system incorporating a torsional sensing unit responsive to variations in the draft load of an implement to transmit a signal to actuate a power lift mechanism for adjusting implement working depth in accordance with draft load variations.

In the prior art, various means have been provided in draft control systems for balancing draft forces against a force-resisting and yieldable means such as springs operative to resist tension and compression forces produced in the draft links of a hitch linkage mechanism used for connecting the implement to the tractor. While some of these prior devices were generally acceptable for this purpose, they were not entirely satisfactory since they were either not sufficiently sensitive or adequately responsive to changes in draft loads; or they were not fool-proof; or they were too costly to fabricate. In other cases the sensing means utilized could not be adapted for incorporation in conventional tractors without effecting substantial and costly structural changes therein.

Thus, an object of the present invention is to provide an improved torsional sensing unit for an implement hitch draft control system.

Another object of the invention is to provide a highly sensitive, readily responsive, simple and inexpensive to fabricate force-resisting and yieldable means interconnecting a tractor hitch mechanism draft link and an associated tractor wherein limited oscillating movement thereof responsive to variations of draft loads imposed on an attached implement are transmitted without lost motion, undue friction or delay to an actuating valve means of an associated power lift mechanism to maintain a constant implement depth by rapidly adjusting to variations in draft load.

Still another object of the invention is to provide a torsional sensing unit for a tractor hitch draft control system incorporating a plurality of leaf spring packs located radially about a center responding to variations in draft load on an associated tractor implement.

Still another object of the invention is to provide a torsional sensing unit which may be readily mounted on conventional tractor frames to provide a unit which is sensitive and reactive in torsional stressing to resist compressive and tension forces produced in a draft link as a result of variations in draft load imposed on an implement attached to a tractor so as to transfer a signal of such variations in draft movement to an actuating valve means of an associated power lift mechanism to adjust implement working depth.

Still another object of the invention is to provide a torsional sensing unit which is readily adapted to accommodate relatively larger or smaller draft loads dependent upon the condition of the soil in which the implement is to be utilized for maximum sensitivity to draft load variations.

These and other objects of the invention will become clear upon a consideration of the following description when considered in conjunction with the accompanying drawings, wherein:

FIGS. 1 and 2 are fragmentary side elevational views of the rear portion of a tractor and attached implement wherein embodiments of the torsional sensing means of the invention are incorporated respectively in association with the upper draft link and the lower draft links of the hitch mechanism;

FIG. 5 is a sectional view in side elevation of the torsional sensing means of FIG. 1;

FIGS. 6 and 7 are front elevational views in section of the torsional sensing means of FIG. 5 with the sensing unit shown in two different positions;

FIG. 8 is a plan view partially in section showing another embodiment of the invention as applied in association with the lower draft links of the hitch mechanism;

FIG. 9 is a front elevational view in section of the torsional sensing unit of FIG. 8 with an associated rotational limiting means shown thereon;

FIG. 10 is a side elevational view partially in section showing another embodiment of the invention;

FIG. 11 is a sectional view in front elevation of the embodiment of the invention of FIG. 10.

Figure 3:
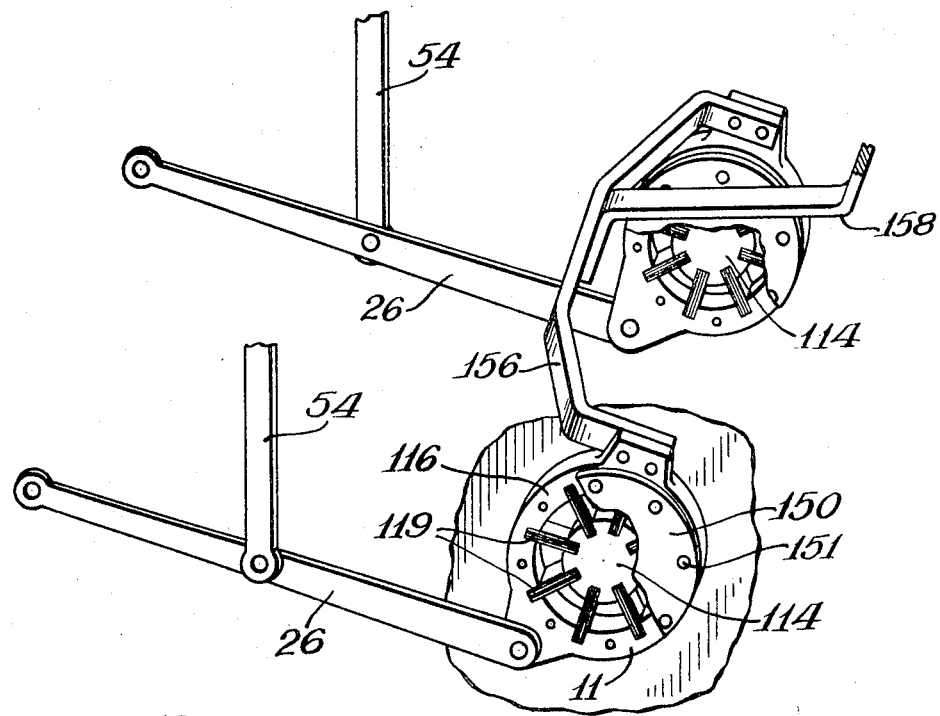
FIG. 3 is a simplified perspective view of the torsional sensing means of the invention shown in association with the lower draft links of a tractor.

Referring now to the drawings, the arrangement selected for depicting one preferred form of the invention in FIGS. 1 and 2 includes a tractor 10, the rear portion of which is shown including a longitudinal frame 12 having a transversely extending rear axle housing assembly 14 at the rear portion of the frame, the rear axle housing assembly 14 supporting conventionally a transversely extending rear axle, not shown, and a pair of laterally spaced traction wheels 16, only one of which is shown, an associated agricultural implement 18, depicted as a plow, having an implement frame 20 and a rigid mast portion 22 connected to the tractor by means of draft control means or linkage designated generally by the numeral 24 and including a pair of lower draft or hitch links 26, only one of which is shown, and an upper draft or hitch link 28 connected to the tractor frame.

The lower draft links, FIG. 1, have a forward end 30 and a rear end 32 with the forward end 30 thereof pivotally connected to the tractor frame for vertical swinging movement therefrom with the rear end 32 pivotally connected to the implement frame. The upper draft link 28 has a rear portion 34 which is pivotally connected as at 36 to an upper portion of the rigid mast portion 22 of the implement. As is well known, the lower links 26 and the upper link 28 comprise what are commonly termed draft means for effecting a draft connection between the tractor and the implement 18 borne by the vehicle.

In accordance with the invention, torsional sensing means comprising a torsional sensing unit designated generally by the numeral 40 comprising a force-resisting and yieldable means is mounted on a rear portion of the tractor frame. In the embodiment of the invention illustrated in FIG. 1, the torsional sensing unit 40 is mounted rearwardly of and above the rear housing assembly and is connected pivotally as at 42 to a forward end 44 of the upper draft link 28 to effect limited rotation or oscillation of the torsional sensing unit 40 upon changes in draft force on the implement 18 placing a compression or tension force on link 28 and tending to effect movement forwardly or rearwardly of the upper draft link 28. The torsional sensing unit 40 is connected pivotally to a draft control or sensing push rod 46 positioned for longitudinal movement with respect to the tractor to effect actuation of a draft valve to be hereafter described of conventional construction. The torsional sensing means is connected operatively in a draft control system, FIG. 4 which includes a transversely extending rotatably mounted rockshaft 48 mounted for rotation on the tractor, the rockshaft 48 having a rearwardly extending lift arm 50 secured to the rockshaft for rotation therewith and pivotally connected to a lift link 52 pivotally connected at its lower end 54, FIG. 1, to an intermediate portion of the lower draft links as at 56.

Figure 4:
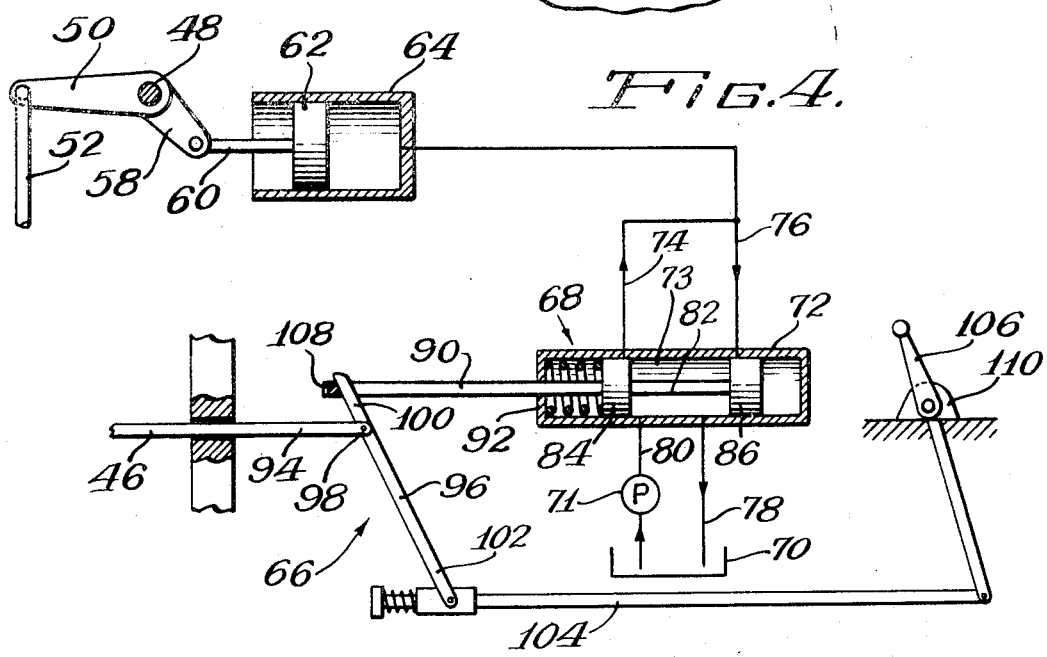
FIG. 4 is a schematic view partially in section, showing the hydraulic system with which the torsional sensing means are associated.

The rockshaft 48, FIG. 4, is seen to have a bellcrank arm 58 constrained for rotation therewith, the bellcrank arm 58 being pivotally connected to a piston rod 60 of a piston 62 positioned within a draft control cylinder 64 comprising a single acting hydraulic ram connected communicatively in a draft control hydraulic system indicated generally by the numeral 66. The draft control hydraulic system 66 may be housed in a secondary tractor housing 67, FIG. 1, above the rear housing assembly and includes actuator or draft valve means 68, FIG. 4, a fluid reservoir 70, and an engine driven pump 71. The actuator valve means 68 includes a valve housing 72 having an interior chamber 73 in fluid communication with draft control cylinder 64 by an inlet line 74 and an exhaust line 76. The chamber 73 is also in fluid communication with the fluid reservoir 70 by exhaust line 78 and inlet line 80, the pump 71 being positioned in inlet line 80. A spring biased spool valve 82 having first and second lands 84, 86 is positioned within valve housing 72 and is biased by a spring 88 at the left end of the housing, as viewed in the drawing, to position the piston 82 so that the spool land portions 84 and 86 normally overlie the openings, not shown, to lines 74, 76 and thus close communication from interior chamber 72 to lines 74 and 76 thereby preventing the entrance or release of fluid to or from draft control cylinder 64, as is well understood. The spool 82 has a spool rod 90 connected thereto and extending through the left end wall 92 of the chamber 72.

The draft control rod 46, connected at its one end to torsional sensing unit 40, is longitudinally movable with respect to the tractor frame and is pivotally connected at its other end 94 to a pivotal element 96 which is part of the draft control linkage. The pivotal element 96 has first and second ends 100, 102 and is pivotally connected at end 102 to a spring biased rod 104 which is operated by a draft control lever 106. Spool rod 90 has a flange 107 at its outer end which abuts the end 100 of pivotal element 98, as is generally well known.

In operation, the draft control lever 106 is moved to a pre-selected position on a quadrant 110 corresponding to an anticipated draft load. Thus, movement of the draft control lever 106 to the right or clockwise as viewed in FIG. 4 effects movement of the spring biased rod 104 to the left; rod 46 is fixed at this time and pivotal element 96 rotates clockwise about its pivotal connection 98 with rod 46. End 100 of pivotal element 96 moves to the right permitting movement of spool 82 under influence of its biasing spring 88 to the right placing discharge line 76 in fluid communication with the reservoir 70 through line 78. Upon release of fluid from the draft control cylinder 64, the piston 62 is urged to the right, as viewed in the drawings, as a result of weight of the implement 18 moving the draft linkage 24; and the implement is thereby lowered into the ground.

In a similar manner, movement of the draft control lever 106 to the left or counterclockwise, as viewed in the drawings, tends to move valve 68 to the left closing discharge line 76 and opening communication of the valve 68 with intake line 74 permitting a flow of fluid under pressure from the reservoir 70 through lines 80 and 74 to draft control cylinder 64 effecting movement of the piston 62 to the left effecting clockwise rotation of bellcrank arm 58, rockshaft 48 and lift arm 50 to raise drop link 52 and the implement.

The torsional sensing unit 40 comprises a force-resisting and yieldable means interconnecting the draft links of the hitch mechanism and the tractor. The torsional sensing unit 40 is mounted on the tractor frame in a substantially vertical plane to resiliently resist longitudinal movement of the draft link to which it is attached, that is, to upper draft link 28 or as illustrated in FIG. 2 to lower draft links 26. The torsional sensing unit is reactive in torsional stressing to resist compression and tension forces produced in the draft links as a result of variations in draft imposed on the implement.

Referring now to FIGS. 5–7, the torsional sensing units of FIG. 1 are seen to include a pair of interfitting sensing members comprising radially inner member 114 and a radially outer or housing member 116 spaced therefrom. Resilient means 118 are positioned therebetween connecting the inner and outer members 114, 116. One of the pair of sensing members 114, 116 is stationary or fixed to the frame against rotation with the other of the members being rotatable and connected pivotally to the draft linkage 24 and to the sensing push rod 46. Longitudinal movements of the draft links 26, 28 reflecting changes in draft forces on the implement 18 are transmitted to the rotatable sensing member which is resiliently connected to the fixed member and the rotatable member is thus resiliently restrained against rotation by reason of the resilient connection therebetween. The torsional sensing unit illustrated in FIG. 5 includes a cylindrical axially extending inner or hub member 114 which is fixed against rotation by mounting to the vehicle frame; the outer member 116 comprises an annular housing member positioned circumferentially about the inner member. Resilient leaf spring means 118, comprising a plurality packs of leaf springs 119, are positioned therebetween resiliently interconnecting the inner and outer members. The fixed hub member is axially stepped as seen in FIG. 5 including first and second circumferential outer portions 120, 124, the outer portion 124 having a plurality of circumferentially spaced radially extending slots 125 therein adapted to receive the leaf spring means 118.

The housing member 116 is adapted to be positioned circumferentially about the inner member 114 and is circumferentially spaced therefrom to receive the resilient members 119 and to provide a bearing surface 126. The housing member 116 is adapted for limited rotation or oscillation with respect to the inner member 114, the housing member being shown in a rotated position with respect to the hub member in FIG. 6. The housing member 116 has first and second sides or radial faces 128, 130 and is disposed proximate its first side 128 about the outer member. The housing member 116 has a circumferential inner portion 132 thereof having a plurality of circumferentially spaced radially extending slots 133 therein positioned proximate the second side 130 of the housing member and positioned when the resilient means 118 are at rest or in an unstressed condition generally complementary to and radially opposed to the radially extending slots 125 of the inner hub member. The housing member is provided with first and second crank means comprising crank portions 134, 136 for connection respectively to the draft control rod 46 and to the draft links. The crank portions 134, 136 are positioned at a radially outer position of the housing member. Crank portion 136 is pivotally connected, FIG. 1, to the draft link 28 to effect limited rotation of the outer member. Crank portion 134 is pivotally connected to the draft control rod 46 for transmitting a signal to the actuator valve means 60 as will be hereafter described. The resilient leaf spring means 119 resiliently and slidably interconnect the rotatable housing member 116 and the stationary inner member 114, the leaf spring packs being positioned for sliding movement in the respective slots 125, 133 of the inner and outer members 114, 116 and are fixedly secured in the other of the pair of sensing members to progressively resist torque applied to the rotating member 116 with a minimum of frictional resistance to rotational bending. Thus, the leaf spring packs resiliently resist rotation of the rotatable outer member 116 with a predetermined force.

Upon movement of the member 116 due to torsional forces on the crank 136 of the rotational member above such predetermined force, transmitting-crank portion 134 transmits a signal of such change through draft control rod 46 to the valve means without any lag, friction or delay. As should be clear from the drawing, the leaf spring slots 133 in the outer member 116 taper radially and the slots 125 in the inner member 114 also taper radially to permit bending of the leaf springs in a smooth manner without undue resistance due to sharp corners of the inner and outer members 114, 116.

Means are provided to mtaintain the resilient spring means within the slots 125, 133 within the torsional sensing members, such means comprising a coverplate 150 secured to the housing member 116 as by bolting as shown at 151.

In a preferred embodiment of the invention, one of first and second ends of the leaf spring packs 118 are fixedly secured within the slots against sliding movement therein, with the other ends 118 of the leaf spring packs being loosely positioned within their respective slots and thus being relatively free to move within the slots. Thus, in FIGS. 6 and 7, consider that the radially inner ends 117 of the spring packs 146 are secured within the grooves of the inner member 114 as by force fitting therein and the outer ends 118 of the resilient leaf spring packs are relatively loosely positioned in their respective grooves.

Referring now to FIG. 2 the torsional sensing unit 40a is shown in a lower link sensing system wherein two torsional sensing units are utilized, that is, one sensing unit 40a on either side of the tractor. In the embodiment of the invention shown in FIG. 2 a simplified perspective view of which is shown in FIG. 3, the upper crank portions 134 are joined together by load spreading or equalizing means comprising a transverse bar 156, FIG. 3 pivotally connected to a center bar 158 which is connected by means, not shown, of a conventional nature to the longitudinally movable draft control rod 46 to actuate draft valve 68.

Referring now to FIGS. 8-9, wherein like numbers are used to designate like parts with the addition of the suffix b, another embodiment of the invention is shown wherein the outer housing member 116b is stationary and wherein the center member 114b oscillates, receiving changes in draft forces from the draft links and transmitting a sensing of such changes in draft force to draft control rod 46 connected thereto to draft valve 68. The manner in which the torsional sensing unit is connected to the tractor is best seen in FIG. 8 wherein a pair of torsional sensing units 40b of modified form are shown and wherein the centerline of the rear axle housing assembly 14b of the tractor is along the line 21—21. Thus, the upper portion of FIG. 8 is seen to be proximate to the forward portion of the tractor with the lower portion of FIG. 8 at the rear of the tractor.

In the embodiment of FIG. 8, the outer housing member 116b of the torsional sensing unit is secured fixedly to a vertically disposed body portion 166 which may constitute a part of the tractor frame; and the center or hub member 114b is permitted to oscillate or rotate through a limited arc being resiliently connected to the outer housing member by packs of leaf spring including five springs similar to those illustrated in FIGS. 6 and 7. The body portions 166 include transversely disposed aligned openings 168, 170 therein each having a journalling bushing 172 and Teflon liner 173 positioned therein for receipt of the inner or hub member 114b of the torsional sensing unit. The hub members 114b of the torsional sensing units are elongated transversely positioned members having splines 174 thereon at inner ends 175 for effecting rotation therewith of a lower sensing arm 176 splined or otherwise connected to the inner or hub members 114b for rotation therewith. The lower sensing arm 176 is connected by conventional means, not shown, to a draft control rod for effecting actuation of draft control valve 68. The hub members are joined together at their axially inner ends 175 to prevent their inadvertent removal from the tractor frame; and each hub member has an axially outer end 177 provided with a crank arm 178 pivotally connected to the lower draft links 26 of the implement.

A cover plate 150b secured to the outer sensing member maintains the resilient leaf spring means within the torsional sensing unit. Appropriate O-ring seals 180 may be provided to seal the torsional sensing unit from contamination and a lubricant may be utilized therein to ensure a minimum of friction free sensing of the torsional sensing unit.

Referring to FIG. 7 the manner in which the slots 125, 133 are tapered may be seen. The radial extending slots of the inner and outer members of the torsional sensing unit are parabolically curved along their leading outer portions to permit each individual spring pack to align itself along the contour of the slots during loading, insuring a gradual shortening of the unsupported span of the spring pack as load thereon increases. While laminated leaf spring packs are shown in FIG. 7 to include five leaf springs per pack, the number of spring leafs in a pack may be decreased or increased by changing spring leaf thickness to compensate for a desired partitcular draft control. In addition, it should be clear that while eight circumferentially arranged spring packs have been shown, the number of spring packs may be increased or decreased in number to permit changing the rate of torsional loading.

Referring now to FIG. 9, means are provided to ensure that sudden increases in torsional load or excessive torsional loading on the torsional sensing units do not result in radial movement of the spring packs out of their slots with resultant inconvenience in replacing the packs or resultant damage to the sensing units. Such means include a pair of adjustable stop brackets 182, 183 secured to the outer housing member 116. An adjustable stop bolt 184, 185 is positioned respectively in the adjustable stop brackets 182, 183 in threaded openings 186, 187 provided for this purpose with lock nuts 188, 189 provided for adjustment of the stop bolts 184, 185. The bolts 184, 185 are positioned to permit a limited rotation of the crank arms 178 as shown at about 6 degrees clockwise and counterclockwise from a substantially vertical position in which the crank arm is shown in FIG. 9.

Another embodiment of the invention is illustrated in FIGS. 10, 11 wherein like parts are indicated by like numerals with the addition of the suffix c. In the torsional sensing unit of FIG. 10, the inner or hub member 114c of the unit is adapted to be secured fixedly to the tractor frame by appropriate connecting members. The outer or housing member comprising the oscillating portion of the torsional sensing unit includes two identical housing portions 190, 192 adapted to mate with each other and provided with an appropriate housing opening 194 and slots therein for receipt of resilient leaf spring packs 119c. An appropriate bushing 196 and Teflon bearing liner 198 are provided for greater sensitivity and friction-free rotation of the oscillating outer housing member. As before indicated, the torsional sensing unit may be packed with fiber grease or other suitable lubricant of conventional nature for friction free torsional sensing. To maintain the spring packs 119c fixedly within one of the slots, appropriate holding means, FIG. 11, are provided, such holding means comprising a pair of dowel pins 200, 202, one on either side of the spring pack positioned within appropriate openings 204, 205 (FIG. 10) provided for this purpose in the housing members 190, 192.

Since modifications of the details of the embodiments of the invention illustrated in the various figures are contemplated, the invention should be limited only by the scope of the appended claims.

The invention is claimed as follows:

1. In a tractor having a longitudinal frame, a transverse rear axle housing, wheel mounting axle means in said housing, implement attaching draft means adapted to be connected to an associated implement, said draft means positioned behind the tractor housing including rearwardly extending link means pivotally mounted on the frame, lift means to raise and lower the link means of an associated implement, and control valve means to operate said lift means, the combination therewith of a sensing means comprising relatively coplanar, rotatable inner and outer members, resilient means interconnecting said members for resiliently resisting, in elastic bending, a relative motion between said members, one of said inner and outer members being rotatable and the other fixedly attached to said tractor, said rotatable member having at first and second crank means mounted thereon, said first crank means being connected pivotally to said link means for rotation of said crank means and rotatable member on an axis generally parallel to said axle means upon changes in draft load, said second crank means being operatively connected to said control valve means for transmission of changes in implement draft loads from said link means to said valve means.

2. An apparatus as defined in claim 1 in which said resilient means are radially interconnected between said inner and outer members so as to be resiliently stressed in bending.

3. An apparatus as defined in claim 1 in which said resilient means comprises radially extending leaf spring means positioned between said inner and outer member so as to resiliently resist rotation of said rotable member with respect to said stationary member.

4. In a tractor having a hitch means for coupling a trail behind device thereto, a power lift unit for vertically raising and lowering the hitch means on said tractor, control means for operating said power lift unit, an improved sensing means to effect actuation of said control means responsive to changes in draft load on said tractor, said sensing means comprising: inner and outer relatively rotatable members, one of said members rigidly attached to said tractor, the other of said members being interconnected between said hitch means and said control means, and resilient means interposed between said inner and outer members for resiliently opposing the draft force exerted on said tractor when stressed in elastic bending whereby changes in draft load on said tractor effect rotation of said rotatable member and actuation of said control means to raise or lower said hitch means in response to changes of draft load on said tractor.

5. An apparatus as defined in claim 4 in which said resilient means comprises a leaf spring radially interconnecting said inner and outer members.

6. In a tractor having a longitudinal frame and a rear axle extending transverse said frame, upper and lower draft links positioned at a rear portion of said frame rearwardly of said rear axle, said upper and lower draft links supporting an associated implement trailing said tractor, lift means for raising and lowering of said draft links and said implement supported thereby, and control means to operate said lift means, the combination therewith comprising:

torsional sensing means to effect actuation of said control means responsive to changes in draft load on said implement, said torsional means including first and second interfitting relatively rotatable sensing members comprising a housing member and a hub member positioned therein, said hub member having a radially outer portion having a plurality of circumferentially spaced radially extending slots therein, said housing member positioned circumferentially about said hub member for rotation of one of said two sensing members with respect to the other, said other member being a non-rotatable member fixedly mounted on said frame;

said housing member having a radially inner portion having a plurality of circumferentially spaced radially extending slots therein positioned generally corresponding to and radially opposed to said slots of said hub member; first crank means on said rotatable sensing member to effect rotation thereof; second crank means on said rotatable sensing member; means connecting said second crank means and said control means to actuate said control means upon rotation of said rotatable sensing member;

resilient spring means within said slots extending radially between and restraining said interfitting sensing members against relative rotation, said rotatable sensing member first crank means being pivotally connected at an outer end to one of said upper and lower links comprising said draft linkage, said other links of said upper and lower links being pivotally connected to said tractor frame;

whereby changes in draft load on said implement effect rotation of said rotatable sensing member and an actuation of said control means to raise or lower said draft links responsive to said change in draft load on said implement.

7. The combination of claim 6 wherein said torsional sensing means is positioned rearwardly of and above said rear axle and wherein said first crank means is pivotally connected to a forward end of said upper draft link.

8. The torsional sensing unit of claim 6 wherein the spring means extending between the sensing members comprises a plurality of packs of leaf springs, each pack having first and second ends, said first ends being positioned in said slots of said housing member, said second ends being positioned in said corresponding slots of said hub member.

9. The combination of claim 8 wherein at least one end of each pack of leaf springs is secured in its slot against radial movement therefrom.

10. The combination of claim 6 wherein said torsional sensing unit is positioned rearwardly of and below said rear axle and wherein said first crank means is pivotally connected to a forward end of at least one of said lower draft links.

11. The combination of claim 10 wherein said hub member is fixedly mounted to said vehicle frame against rotation and wherein said housing member is rotatable with respect to said hub member.

12. The combination of claim 6 wherein said torsional sensing means includes a pair of torsional sensing units comprising said hub and housing members and interconnecting spring means, said units being positioned one on either side of said tractor frame and wherein said hub members are fixedly mounted on said frame and said housing members are rotatable, said first crank means on said housing members being pivotally connected to a forward end of said lower draft links for limited rotation with respect to said hub members and wherein said hub members are positioned on said tractor frame for rotation of said housing members about an axis extending transverse said tractor frame and substantially parallel to said rear axle.

13. The combination of claim 6 wherein said torsional sensing means includes a pair of torsional sensing units comprising said hub and housing members and interconnecting leaf spring means, said housing members of said units being fixedly mounted on opposite sides of said rear portion of said frame, said hub members comprising elongated, axially extending rotatable members each having an outer end and an inner end, said inner ends being connected together for rotation of said hub members together, at least one of said inner ends having said second crank means thereon connected to said control means to actuate said control means, said outer ends having first crank means thereon connected to forward ends of said lower links for rotation of said hub member on changes in draft load on said implement.

14. In a tractor having upper and lower hitch means for coupling a trail behind device thereto, a power lift unit for vertically raising and lowering the hitch means on said tractor, control means for operating said power lift unit, and improved sensing means to effect actuation on said control means in response to changes in draft loads on said tractor, said sensing means comprising: a pair of inner and outer relatively rotatable members, one member of each pair being attached to said tractor, the other member of each pair being interconnected between said lower hitch means and said control means, and resilient means interposed between said inner and outer members for resiliently opposing the draft force exerted on said tractor when stressed in elastic bending whereby changes in draft load on said tractor effect rotation of said rotatable member and actuation of said control means to raise or lower said hitch means in response to changes of draft load on said tractor.

15. An apparatus as defined in claim 14 in which said inner and outer members have radially opposing retaining means for accepting said resilient means.

16. An apparatus as defined in claim 15 in which said resilient means comprises leaf springs.

17. An apparatus as defined in claim 14 in which said sensing means additionally comprises abutting means disposed about said rotatable member for limiting the rotation of said member with respect to the stationary member.

18. An apparatus as defined in claim 16 in which said pair of inner and outer units are interconnected by load spreading means.

References Cited

UNITED STATES PATENTS

| 1,990,683 | 2/1935 | Wood. | |
| 2,951,695 | 9/1960 | Stone. | |
| 3,241,620 | 3/1966 | Brudnack | 172—7 |

ROBERT E. PULFREY, Primary Examiner

S. C. PELLEGRINO, Assistant Examiner

U.S. Cl. X.R.

261—1